United States Patent
Jiang

(10) Patent No.: US 11,838,771 B2
(45) Date of Patent: Dec. 5, 2023

(54) TROUBLESHOOTING METHOD AND DEVICE, TERMINAL, BASE STATION AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 188 days.

(21) Appl. No.: 17/277,275

(22) PCT Filed: Sep. 26, 2018

(86) PCT No.: PCT/CN2018/107694
§ 371 (c)(1),
(2) Date: Mar. 17, 2021

(87) PCT Pub. No.: WO2020/061837
PCT Pub. Date: Apr. 2, 2020

(65) Prior Publication Data
US 2021/0321272 A1    Oct. 14, 2021

(51) Int. Cl.
| | | |
|---|---|---|
| H04W 24/08 | (2009.01) | |
| H04W 24/00 | (2009.01) | |
| H04W 24/04 | (2009.01) | |
| H04W 76/19 | (2018.01) | |
| H04L 5/00  | (2006.01) | |

(52) U.S. Cl.
CPC ............ *H04W 24/04* (2013.01); *H04L 5/001* (2013.01); *H04L 5/0032* (2013.01); *H04W 76/19* (2018.02)

(58) Field of Classification Search
CPC ..... H04W 24/04; H04W 76/19; H04W 48/14; H04W 76/18; H04W 48/08; H04W 48/16; H04W 76/10; H04L 5/001; H04L 5/0032
(Continued)

(56) References Cited

U.S. PATENT DOCUMENTS

| | | |
|---|---|---|
| 2018/0192383 A1 | 7/2018 | Nam et al. |
| 2019/0028905 A1* | 1/2019 | Veeramallu ............. H04W 4/70 |

(Continued)

FOREIGN PATENT DOCUMENTS

| | | |
|---|---|---|
| CN | 106502848 A | 3/2017 |
| CN | 108496385 A | 9/2018 |

(Continued)

OTHER PUBLICATIONS

International Search Report in the international application No. PCT/CN2018/107694, dated Jun. 3, 2019.
(Continued)

*Primary Examiner* — Tanmay K Shah
(74) *Attorney, Agent, or Firm* — SYNCODA LLC; Feng Ma

(57) ABSTRACT

A method for troubleshooting is applied to the terminal and includes: determining a bandwidth part (BWP) of a current resident cell of the terminal, and accessing a first base station according to the BWP; recording related information of the BWP when the terminal fails to access the first base station; and sending the related information of the BWP to a second base station when the terminal successfully accesses the second base station, with the related information of the BWP being used for troubleshooting.

15 Claims, 9 Drawing Sheets

(58) Field of Classification Search
USPC .......................................................... 455/423
See application file for complete search history.

(56) References Cited

U.S. PATENT DOCUMENTS

| | | | |
|---|---|---|---|
| 2019/0045571 A1* | 2/2019 | Wu ........................ | H04W 76/18 |
| 2019/0052377 A1* | 2/2019 | Hwang .................. | H04L 5/0035 |
| 2019/0182884 A1* | 6/2019 | Deenoo ................. | H04W 16/28 |
| 2020/0374923 A1* | 11/2020 | Cheng ................... | H04B 7/0626 |
| 2022/0191961 A1* | 6/2022 | Qiu ........................ | H04B 7/0695 |

FOREIGN PATENT DOCUMENTS

| | | | | |
|---|---|---|---|---|
| CN | 108521850 A | | 9/2018 | |
| EP | 2887741 A1 | * | 6/2015 | ........ H04W 36/0055 |
| WO | 2018128427 A1 | | 7/2018 | |

OTHER PUBLICATIONS

English translation of the Written Opinion of the International Search Authority in the international application No. PCT/CN2018/107694, dated Jun. 3, 2019.

3GPP TS 38.214 V15.2.0 (Jun. 2018), Technical Specification Group Radio Access Network; NR; Physical layer procedures for data (Release 15).

3GPP TS 38.213 V15.2.0 (Jun. 2018), Technical Specification Group Radio Access Network; NR; Physical layer procedures for control (Release 15).

First Office Action of the Chinese application No. 201880001465.5, dated Aug. 4, 2020.

Second Office Action of the Chinese application No. 201880001465.5, dated Mar. 11, 2021.

* cited by examiner

TROUBLESHOOTING METHOD AND DEVICE, TERMINAL, BASE STATION AND STORAGE MEDIUM

CROSS-REFERENCE TO RELATED APPLICATIONS

This application is a national stage of International Application No. PCT/CN2018/107694 filed on Sep. 26, 2018, the disclosure of which is hereby incorporated by reference in its entirety.

TECHNICAL FIELD

The present disclosure relates to the field of wireless communication technology, and particularly to a method and device for troubleshooting, a terminal, a base station and a storage medium.

BACKGROUND

During operation of a Long-Term Evolution (LTE) wireless network, in order to permanently and stably provide high-quality services for many users, Minimization of Drive Test (MDT) technology is introduced in the LTE for assisting a base station to troubleshoot.

The MDT supports an idle state and a connected state. During a process that a terminal in the idle state initiates connection establishment or connection recovery, if connection establishment is failed or connection recovery is failed, the terminal reports, to a base station, related failure information of a cell where the terminal camps currently, and the related failure information is used by the base station to perform troubleshooting. The related failure information includes at least one of a Public Land Mobile Network (PLMN) identity of a cell where connection is failed, a global unit identity of a cell where connection is failed, a measurement result of a cell, location information of a terminal, and related information of random access. The related information of random access includes at least one of the number of transmitting a random access preamble, detection of contention, and reaching maximum transmit power.

There are multiple BWPs in one cell. If only the related failure information of a camping cell is reported, the base station cannot perform troubleshooting based on the related failure information of the camping cell.

SUMMARY

The present disclosure provides a method, a device for troubleshooting, a terminal, a base station and a storage medium, which solves a problem that the base station cannot perform troubleshooting based on related failure information of a camping cell, thereby improving accuracy of troubleshooting, the technical solution includes the following aspects.

A first aspect of the embodiments of the present disclosure provides a method for troubleshooting, which is applied to a terminal, and includes following operations.

A bandwidth part (BWP) of a cell where the terminal camps is determined, and a first base station is accessed based on the BWP.

Related information of the BWP is recorded in response to that the terminal fails to access the first base station.

The related information of the BWP is transmitted to a second base station in response to that the terminal accesses the second base station successfully, and the related information of the BWP is used for troubleshooting.

The case that the terminal fails to access the first base station includes at least one of following conditions: connection establishment is failed, connection recovery is failed or a system message request is failed.

In a possible implementation, a first timer is started when the terminal transmits a connection establishment request to the first base station, and it is determined that connection establishment between the terminal and the first base station is failed in response to that the first timer times out.

Alternatively, a second timer is started when the terminal transmits a connection recovery request to the first base station, and it is determined that connection recovery between the terminal and the first base station is failed in response to that the second timer times out.

In a possible implementation, the related information of the BWP includes frequency domain location information of the BWP. The frequency domain location information of the BWP includes location information and bandwidth information, and the operation that the related information of the BWP is recorded includes following operations.

Location information and bandwidth information of an initial BWP in a carrier of the camping cell is acquired from a System Information Block SIB1 transmitted by the first base station.

The location information and the bandwidth information of the initial BWP are recorded.

In a possible implementation, the frequency domain location information of the BWP includes location information of a starting Resource Block (RB), and the operation that the related information of the BWP is recorded includes following operations.

Location information and bandwidth information of an initial BWP in a carrier of the cell where the terminal camps is acquired from a System Information Block SIB1 transmitted by the first base station.

The location information of the starting Resource Block (RB) in the initial BWP is acquired from the location information and the bandwidth information of the initial BWP.

The location information of the starting RB is recorded.

In a possible implementation, the related information of the BWP includes frequency domain location information of a Synchronization Signal block (SSB) corresponding to the BWP.

In a possible implementation, the frequency domain location information of the SSB is a subcarrier offset, and the operation that the related information of the BWP is recorded includes following operations.

The subcarrier offset of the SSB corresponding to the BWP is acquired from a Master Information Block (MIB) transmitted by the first base station, and the subcarrier offset of the SSB is recorded.

In a possible implementation, the operation that the BWP of the cell where the terminal camps is determined includes following operations.

An initial BWP selected when the terminal camps on the cell is determined.

In a possible implementation, the operation that the related information of the BWP is transmitted to the second base station includes following operations.

An access complete message is transmitted to the second base station. The access complete message includes a reporting indication, and the reporting indication indicates that there is the related information of the BWP to be reported based on which accessing the first base station is failed.

An acquisition request which is transmitted by the second base station in response to the access complete message is received. The acquisition request is used to request the related information to the BWP.

The related information of the BWP is transmitted to the second base station in response to the acquisition request.

A second aspect of the embodiments of the present disclosure provides a method for troubleshooting, which is applied to a second base station, the method includes following operations.

Related information of a BWP transmitted by a terminal is received in response to the terminal successfully accesses the second base station. The related information of the BWP is related information of a BWP used when the terminal fails to access a first base station.

Troubleshooting is performed on the BWP based on the related information of the BWP.

In a possible implementation, the operation that the troubleshooting is performed on the BWP based on the related information of the BWP includes following operations.

The related information of the BWP is transmitted to a tracking collection entity (TCE), and the related information of the BWP is used by the TCE to perform troubleshooting on the BWP.

In a possible implementation, the operation that the related information of the BWP transmitted by the terminal is received includes following operations.

An access complete message transmitted by the terminal is received. The access complete message includes a reporting indication, and the reporting indication indicates that there is the related information of the BWP to be reported based on which accessing the first base station is failed.

An acquisition request is transmitted to the terminal in response to the access complete message. The acquisition request is used to request the related information of the BWP.

The related information of the BWP which is sent by the terminal in response to the acquisition request is received.

A third aspect of the embodiments of the present disclosure provides a device for troubleshooting, which is applied to a terminal, and the device includes a first determining module, a recording module and a transmitting module.

The first determining module is configured to determine a BWP of a cell where the terminal camps, and access a first base station based on the BWP.

A recording module is configured to record related information of the BWP in response to that the terminal fails to access the first base station.

A transmitting module is configured to transmit the related information of the BWP to a second base station in response to that the terminal accesses the second base station successfully. The related information of the BWP is used for troubleshooting.

The case that the terminal fails to access the first base station includes at least one of following conditions: connection establishment is failed, connection recovery is failed or a system message request is failed.

In a possible implementation, the device may further include a second determining module or a third determining module.

The second determining module is configured to start a first timer when the terminal transmits a connection establishment request to the first base station, and determine that connection establishment between the terminal and the first base station is failed in response to that the first timer times out.

The third determining module is configured to start a second timer when the terminal transmits a connection recovery request to the first base station, and determine that connection recovery between the terminal and the first base station is failed in response to that the second timer times out.

The related information of the BWP includes frequency domain location information of the BWP.

In a possible implementation, the frequency domain location information of the BWP includes location information and bandwidth information, and the recording module is further configured to acquire, from a System Information Block SIB1 transmitted by the first base station, location information and bandwidth information of an initial BWP in a carrier of the camping cell, and record the location information and the bandwidth part information of the initial BWP.

In a possible implementation, the frequency domain location information of the BWP includes location information of a starting RB, and the recording module is further configured to acquire, from a System Information Block SIB1 transmitted by the first base station, location information and bandwidth information of an initial BWP in a carrier of the camping cell, and acquire, from the location information and the bandwidth information of the initial BWP, the location information of the starting RB in the initial BWP; and record the location information of the starting RB.

In a possible implementation, the related information of the BWP includes frequency domain location information of an SSB corresponding to the BWP.

In a possible implementation, the frequency domain location information of the SSB is a subcarrier offset, and the recording module is further configured to acquire, from a MIB transmitted by the first base station, the subcarrier offset of the SSB corresponding to the BWP, and record the subcarrier offset of the SSB.

In a possible implementation, the first determining module is further configured to determine an initial BWP selected when the terminal camps on the camping cell.

In a possible implementation, the transmitting module is further configured to transmit an access complete message to the second base station. The access complete message includes a reporting indication, and the reporting indication indicates that there is the related information of the BWP to be reported based on which accessing the first base station is failed. The transmitting module is configured to receive an acquisition request which is transmitted by the second base station in response to the access complete message. The acquisition request is used to request the related information to the BWP. The transmitting module is configured to transmit the related information of the BWP to the second base station in response to the acquisition request.

A fourth aspect of the embodiments of the present disclosure provides a device for troubleshooting, which is applied to a second base station, the device includes a receiving module and a troubleshooting module.

The receiving module is configured to receive related information of a BWP transmitted by a terminal in response to the terminal successfully accesses the second base station. The related information of the BWP is related information of a BWP used when the terminal fails to access a first base station.

The troubleshooting module is configured to perform troubleshooting on the BWP based on the related information of the BWP.

In a possible implementation, the troubleshooting module is further configured to transmit the related information of the BWP to a TCE. The related information of the BWP is used by the TCE to perform troubleshooting on the BWP.

In a possible implementation, the receiving module is further configured to receive an access complete message transmitted by the terminal. The access complete message includes a reporting indication, and the reporting indication indicates that there is the related information of the BWP to be reported based on which accessing the first base station is failed. The receiving module is configured to transmit an acquisition request to the terminal in response to the access complete message. The acquisition request is used to request the related information of the BWP. The receiving module is configured to receive the related information of the BWP which is sent by the terminal in response to the acquisition request.

A fifth aspect of the embodiments of the present disclosure provides a terminal, which includes: a processor; and a memory for storing instructions executable by the processor.

The processor is configured to determine a BWP of a cell where the terminal camps currently, access a first base station based on the BWP, record related information of the BWP in response to that the terminal fails to access the first base station, and transmit the related information of the BWP to a second base station in response to that the terminal accesses the second base station successfully. The related information of the BWP is used for troubleshooting, and the second base station and the first base station are same base station or different base stations.

A sixth aspect of the embodiments of the present disclosure provides a base station, which includes: a processor; a memory for storing instructions executable by the processor.

The processor is configured to receive related information of a BWP transmitted by a terminal in response to the terminal successfully accesses the second base station. The related information of the BWP is related information of a BWP used when the terminal fails to access a first base station. The processor is configured to perform troubleshooting on the BWP based on the related information of the BWP.

A seventh aspect of the embodiments of the present disclosure provides a computer-readable storage medium having stored thereon instructions which, when executed by a processor, implement the method for troubleshooting according to any one of claims 1 to 10.

An eighth aspect of the embodiments of the present disclosure provides a computer-readable storage medium having stored thereon instructions which, when executed by a processor, implement the method for troubleshooting according to any one of claims 11 to 13.

In the embodiments of the present disclosure, related information of a BWP is recorded in response to that the terminal fails to access the first base station, and the related information of the BWP is transmitted to the second base station in response to that the terminal accesses the second base station successfully. The second base station performs troubleshooting based on the related information of the BWP, which solves a problem that the second base station cannot perform troubleshooting based on related failure information of a camping cell, and thereby improving accuracy of troubleshooting.

It is to be understood that the foregoing general description and the following detailed description are only exemplary and explanatory and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

In order to make objects, technical solutions, and advantages of the present disclosure clearer, the embodiments of the present disclosure are described in further detail with reference to the accompanying drawings hereinafter.

The exemplary embodiments are described in detail herein, examples of which are illustrated in the accompanying drawings. When the following description involves the drawings, the same numbers in different drawings indicate the same or similar elements unless otherwise represented. The implementations described in the following exemplary embodiments do not represent all implementations consistent with the present disclosure. Instead, the implementations are merely examples of devices and methods consistent with some aspects of the present disclosure as described in detail in the appended claims.

Figure 1:
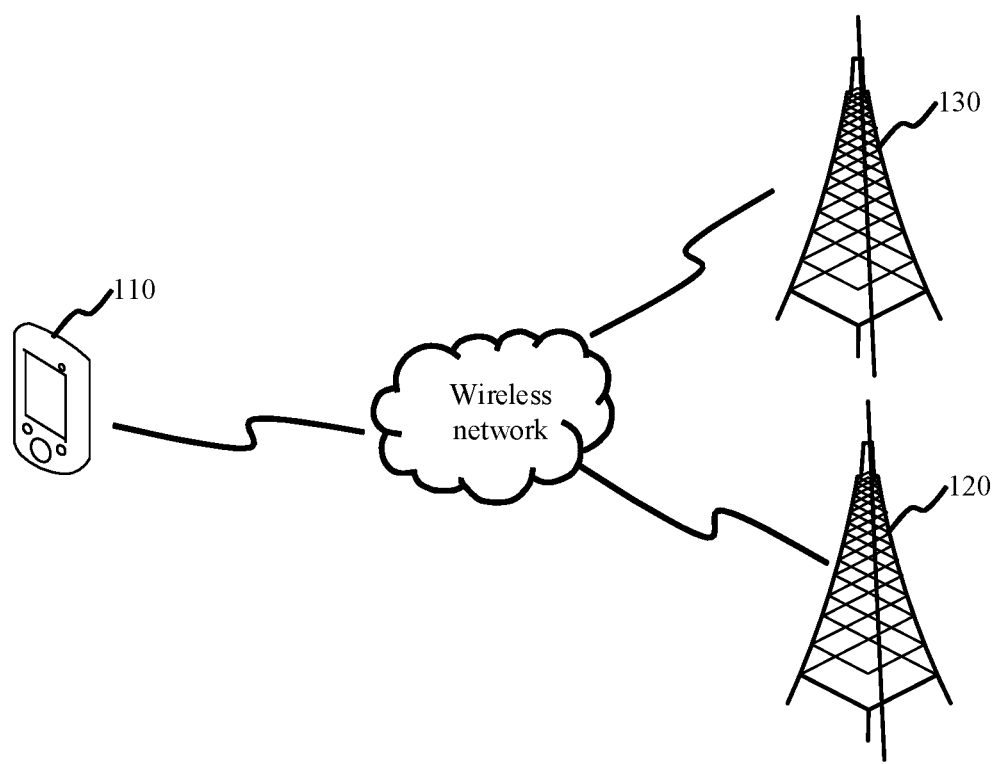
FIG. 1 is a schematic diagram of system architecture involving a method for troubleshooting according to some exemplary embodiments of the present disclosure.

FIG. 1 is a schematic diagram of system architecture involving a method for troubleshooting according to some exemplary embodiments of the present disclosure. The system architecture includes a terminal 110, a first base station 120 and a second base station 130, and the first base station 120 and the second base station 130 may be the same base station or different base stations. The terminal 110 may connect with the first base station 120 or the second base station 130 by a wireless network. In addition, the first base station 120 or the second base station 130 includes at least one cell, and the terminal 110 communicates with the first base station 120 or the second base station 130 in the same manner. For example, the communication with the first base station 120 is taken as an example for description, the terminal 110 selects one cell to camp on, then selects a BWP from a cell where the terminal camps currently, and accesses the first base station 120 based on the BWP, and communicates with the first base station 120. The terminal 110 may be, for example, a handheld device (e.g., a phone terminal), a vehicle device, a wearable device, a computing device or other processing device connected to a wireless modem which has a wireless communication function. The terminal 110 is not limited in the embodiment of the present disclosure.

In the embodiments of the present disclosure, related information of a BWP used in failed accessing is recorded when the terminal the 110 fails to access the first base station 120, and the related information of the BWP is transmitted to the successfully-accessed second base station 130 when the terminal 110 accesses the second base station 130 successfully. The second base station 130 performs troubleshooting based on the related information of the BWP. The related information of the BWP includes frequency domain location information of the BWP and/or frequency domain location information of a SSB, and the related information of the BWP further includes related information of a cell where the BWP is located. The related information of the cell where the BWP is located includes at least one of a PLMN identity of a cell where accessing is failed, a global unit identification of a cell where accessing is failed, a measurement result of the cell, location information of the terminal, and related information of random access. The related information of random access includes at least one of the number of transmitting a random access preamble, detection of contention, and reaching maximum transmit power.

The case that accessing is failed includes at least one of following conditions: connection establishment is failed, connection recovery is failed or a system message request is failed. When the case that accessing is failed includes that connection establishment is failed, the process of recording and reporting the related information of the BWP by the terminal 110 is described as follows.

Before the terminal 110 accesses the first base station 120 for the first time, the terminal 110 selects a BWP, and then transmits a connection establishment request to the first base station 120 based on the BWP. When the connection establishment is failed, the terminal 110 records related information of the selected BWP and re-selects a BWP, accesses the second base station 130 based on the reselected BWP, and reports the related information of the BWP used in failed connection to the second base station 130 in response to that the terminal accesses the second base station 130 successfully.

When the case that accessing is failed includes that connection recovery is failed, the process of recording and reporting the related information of the BWP by the terminal 110 is described as follows. When the connection establishment between the terminal 110 and the first base station 120 is interrupted, the terminal 110 selects a BWP, and then transmits a connection recovery request to the first base station 120 based on the BWP. When the connection recovery is failed, the terminal 110 records the related information of the selected BWP and re-selects a BWP, then accesses the second base station 130 based on the reselected BWP, and reports the related information of the BWP used in failed connection to the second base station 130 in response to that the terminal accesses the second base station 130 successfully.

When the case that accessing is failed includes that system message request is failed, the process of recording and reporting the related information of the BWP by the terminal 110 is described as follows. In a random access process that the terminal 110 randomly accesses the first base station 120, the terminal 110 selects a BWP, and then transmits a system message request to the first base station 120 based on the BWP. When the system message request is failed, the terminal 110 records the related information of the selected BWP and re-selects a BWP, and then accesses the second base station 130 based on the reselected BWP, and reports the related information of the BWP used in failed connection to the second base station 130 in response to that the terminal accesses the second base station 130 successfully.

Figure 2:
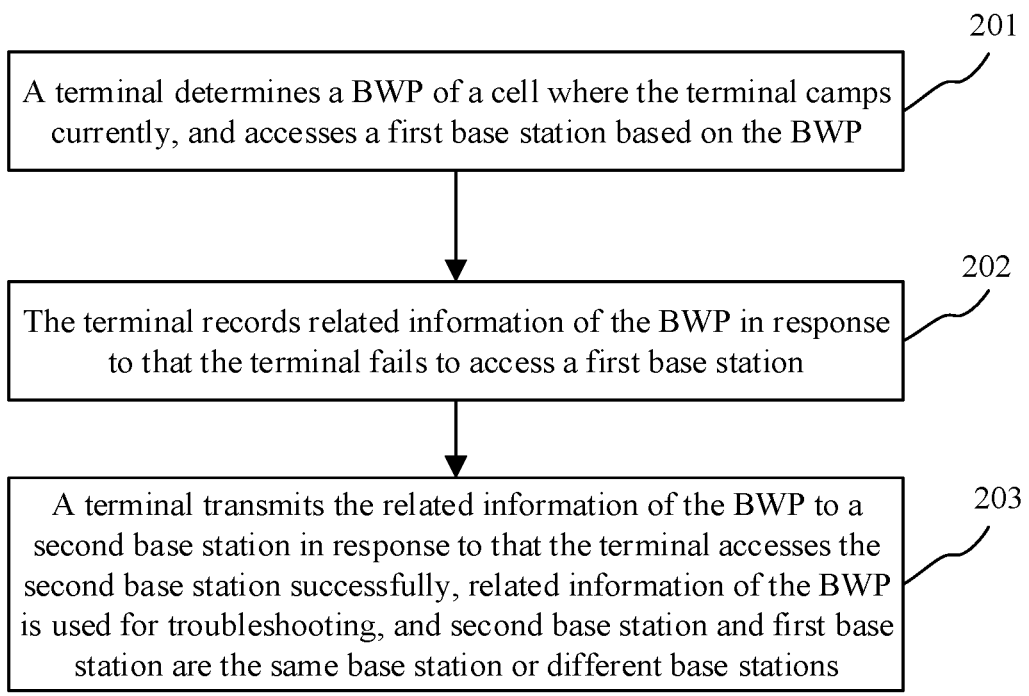
FIG. 2 is a flowchart of a method for troubleshooting according to an exemplary embodiment.

FIG. 2 is a flowchart of a method for troubleshooting according to an exemplary embodiment. The method is applied to a terminal, as shown in FIG. 2, the method for troubleshooting may include following operations.

At S201, the terminal determines a bandwidth part (BWP) of a cell where the terminal camps currently, and accesses a first base station based on the BWP.

At S202, the terminal records related information of the BWP in response to that the terminal fails to access the first base station.

At S203, the terminal transmits the related information of the BWP to a second base station in response to that the terminal accesses the second base station successfully. The related information of the BWP is used for troubleshooting. The second base station and the first base station are same base station or different base stations.

It should be understood that the case that the terminal fails to access the first base station includes at least one of following conditions: connection establishment is failed, connection recovery is failed or a system message request is failed.

In a possible implementation, the method may further include operations. A first timer is started when the terminal transmits a connection establishment request to the first base station, and it is determined that connection establishment between the terminal and the first base station is failed in response to that the first timer times out.

Alternatively, a second timer is started when the terminal transmits a connection recovery request to the first base station, and it is determined that connection recovery between the terminal and the first base station is failed in response to that the second timer times out.

It should be understood that the related information of the BWP includes frequency domain location information of the BWP.

In a possible implementation, the frequency domain location information of the BWP includes location information and bandwidth information, and the operation that the related information of the BWP is recorded includes following operations.

Location information and bandwidth information of an initial BWP in a carrier of the camping cell where the terminal camps is acquired from a System Information Block SIB1 transmitted by the first base station.

The location information and the bandwidth information of the initial BWP are recorded.

In another possible implementation, the frequency domain location information of the BWP includes location information of a starting Resource Block (RB), and the operation that the related information of the BWP is recorded includes following operations.

Location information and bandwidth information of an initial BWP in a carrier of the camping cell where the terminal camps is acquired from a System Information Block SIB1 transmitted by the first base station.

The location information of the starting RB in the initial BWP is acquired from the location information and the bandwidth information of the initial BWP.

The location information of the starting RB is recorded.

The related information of the BWP includes frequency domain location information of a Synchronization Signal block (SSB) corresponding to the BWP.

In a possible implementation, the frequency domain location information of the SSB is a subcarrier offset, and the operation that the related information of the BWP is recorded includes following operations.

The subcarrier offset of the SSB corresponding to the BWP is acquired from a Master Information Block (MIB) transmitted by the first base station, and the subcarrier offset of the SSB is recorded.

In a possible implementation, the operation that the BWP of the cell where the terminal camps currently is determined includes following operations.

An initial BWP selected when the terminal camps on the camping cell is determined.

In a possible implementation, the operation that the related information of the BWP is transmitted to the second base station includes following operations.

An access complete message is transmitted to the second base station. The access complete message includes a reporting indication, and the reporting indication indicates that there is the related information of the BWP to be reported based on which accessing the first base station is failed.

An acquisition request which is transmitted by the second base station in response to the access complete message is received, and the acquisition request is used to request the related information to the BWP.

The related information of the BWP is transmitted to the second base station in response to the acquisition request.

In the embodiments of the present disclosure, the terminal transmits an access base station request to the first base station, the related information of BWP is transmitted to second base station when accessing the base station is failed, and troubleshooting is performed based on the related information of the BWP, which solves a problem that troubleshooting cannot be performed based on related failure information of the camping cell, thereby improving accuracy of troubleshooting.

Figure 3:
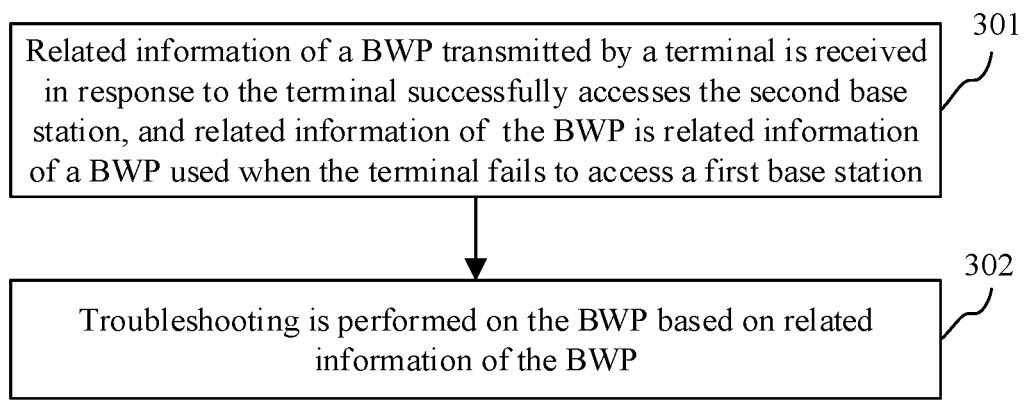
FIG. 3 is a flowchart of a method for troubleshooting according to an exemplary embodiment.

FIG. 3 is a flowchart of a method for troubleshooting according to an exemplary embodiment. The method is applied to a second base station, as shown in FIG. 3, the method for troubleshooting may include following operations.

At S301, related information of a BWP transmitted by a terminal is received in response to the terminal successfully accesses the second base station. The related information of the BWP is related information of a BWP used when the terminal fails to access a first base station.

At S302, troubleshooting is performed on the BWP based on the related information of the BWP.

In a possible implementation, the operation that the troubleshooting is performed on the BWP based on the related information of the BWP includes following operations.

The related information of the BWP is transmitted to a trace collection entity (TCE), and the related information of the BWP is used by the TCE to perform troubleshooting on the BWP.

In a possible implementation, the operation that the related information of the BWP transmitted by the terminal is received includes following operations.

An access complete message transmitted by the terminal is received. The access complete message includes a reporting indication, and the reporting indication indicates that there is the related information of the BWP to be reported based on which accessing the first base station is failed.

An acquisition request is transmitted to the terminal in response to the access complete message. The acquisition request is used to request the related information of the BWP.

The related information of the BWP which is sent by the terminal in response to the acquisition request is received.

In the embodiments of the present disclosure, the terminal transmits an access base station request to the first base station, the related information of BWP is transmitted to the second base station in response to that accessing the base station is failed, and troubleshooting is performed based on the related information of the BWP, which solves a problem that troubleshooting cannot be performed based on related failure information of the camping cell, thereby improving accuracy of troubleshooting.

Figure 4:
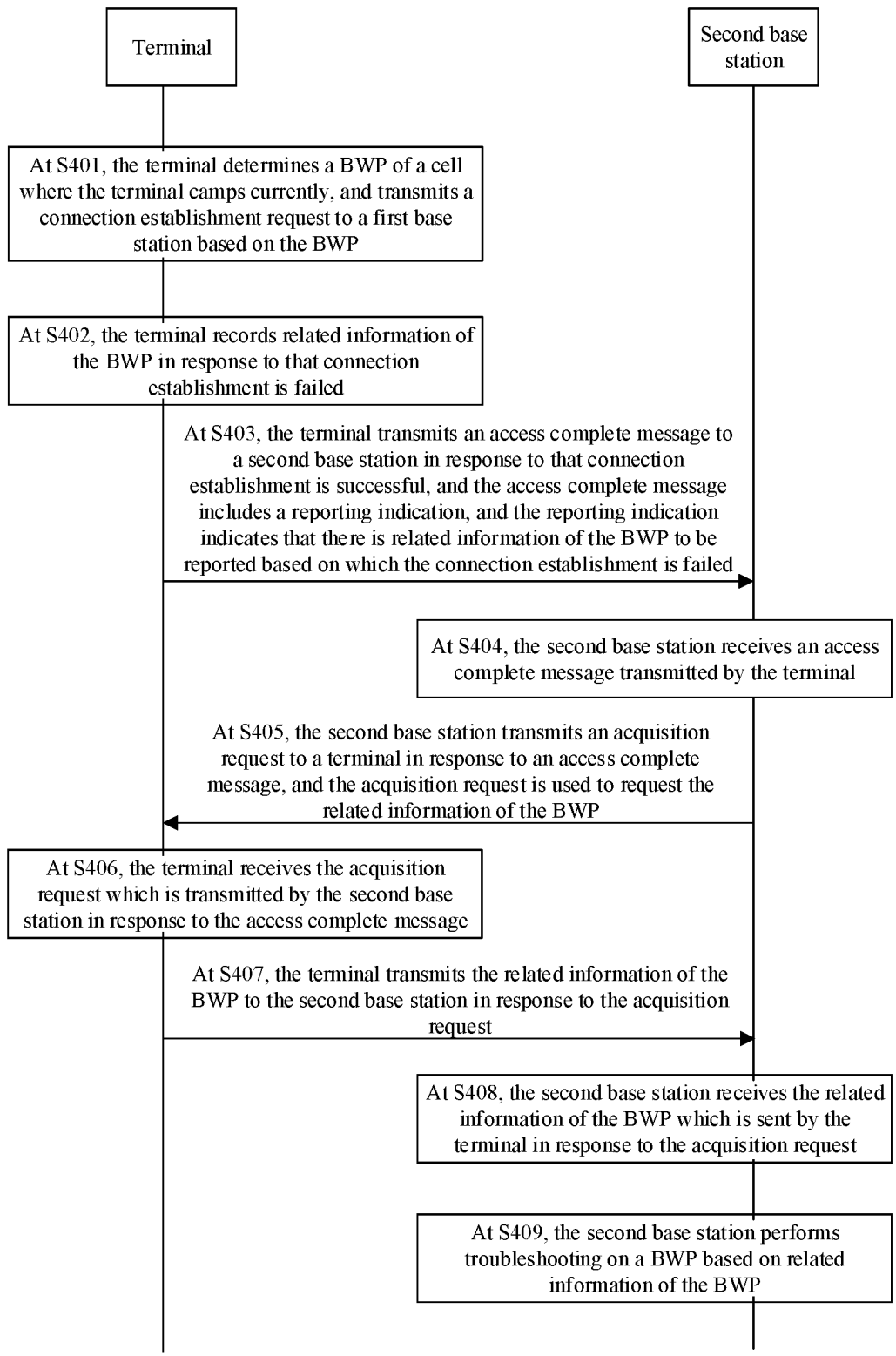
FIG. 4 is a flowchart of a method for troubleshooting according to an exemplary embodiment.

FIG. 4 is a flowchart of a method for troubleshooting according to an exemplary embodiment. In the embodiment of the present disclosure, the following condition is taken as an example for description. The terminal transmits a connection establishment request to a first base station, and records the related information of the BWP in response to that connection establishment is failed, and transmits the related information of the BWP to the second base station in response to that the terminal establishes connection with the second base station successfully, and the second base station performs troubleshooting based on the related information of the BWP. As shown in FIG. 4, the method for troubleshooting may include following operations.

At S401, the terminal determines a BWP of a cell where the terminal camps currently, and transmits a connection establishment request to the first base station based on the BWP.

When the terminal camps on a cell, the terminal needs to determine an initial BWP selected when the terminal camps on the camping cell, and transmit a connection establishment request to the first base station based on the initial BWP. The initial BWP is selected in the following two implementations.

In a first implementation, the terminal searches for a BWP of the camping cell, selects the BWP in response to that the BWP is found, and attempts to access the first base station based on the BWP. The terminal discards the BWP in response to that accessing the first base station is failed based on the BWP, and searches for a BWP until a BWP based on which the terminal accesses the second base station successfully is found.

It should be noted that the terminal may search for the BWP of the camping cell from a high frequency to a low frequency or from a low frequency to a high frequency, or may search for the BWP at a specific frequency directly. The search manner of the terminal is not specifically limited in the present disclosure.

In the second implementation, the terminal may search for a BWP corresponding to an SSB by searching for the SSB. The terminal searches for an SSB of the cell where the terminal camped currently, selects a BWP corresponding to the SSB in response to that the SSB is found, and attempts to access the first base station based on the BWP. The terminal discards the BWP in response to that accessing the first base station based on the BWP is failed, and searches for an SSB again until a BWP based on which the terminal accesses the second base station successfully is found.

Figure 5:
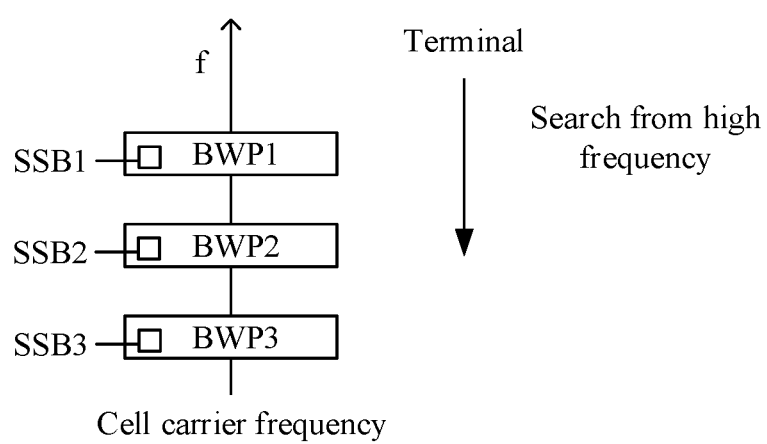
FIG. 5 is a schematic diagram showing that user equipment searches for a BWP in a camping cell according to an exemplary embodiment.

It should be noted that the terminal may search for the SSB of the camping cell from a high frequency to a low frequency, or from a low frequency to a high frequency, or may search for the SSB at a specific frequency that matches an operation frequency of the terminal. The search manner of the terminal is not limited in the embodiments of the present disclosure. As shown in FIG. 5, the camping cell includes three BWPs, the frequencies of the three BWPs are BWP1, BWP2, and BWP3 from high to low, respectively, which correspond to SSB1, SSB2, and SSB3 respectively, and user equipment searches for BWP1, BWP2, and BWP3 from high frequency to low frequency in sequence. If the frequency of the SSB is the same as the operation frequency of the terminal, the frequency of the SSB is considered to match the operation frequency of the terminal.

At S402, related information of the BWP is recorded in response to that connection establishment is failed.

This operation can be implemented by the following operations (1) and (2).

In operation (1), the terminal determines whether the connection establishment is successful, and performs operation (2) in response to that the connection establishment is failed.

A first timer is started when the terminal transmits a connection establishment request to the first base station, and it is determined whether a connection establishment response sent by the first base station is received before the first timer times out. When the connection establishment response sent by the first base station is received before the first timer times out, it is determined that the connection establishment is successful. When the connection establishment response sent by the first base station is not received before the first timer times out, it is determined that the connection establishment is failed.

The connection establishment response may be permission for connection establishment or rejection for connection establishment. The first timer is an access timer. For example, the first timer may be a timer T300, and a first duration set by the first timer may be 100 ms, 200 ms, 600 ms, or 1000 ms, which is no limited in the embodiments of the present disclosure.

In operation (2), the terminal records the related information of the BWP in response to that connection establishment is failed.

The related information of the BWP includes frequency domain location information of the BWP and/or frequency domain location information of the SSB. The frequency domain location of the BWP may include location information and bandwidth information (locationAndBandwidth) of an initial BWP and/or location information ($RB_{start}$) of a starting RB of the initial BWP.

In a first implementation, when the related information of the BWP includes frequency domain location information of the BWP, and the frequency domain location information of the BWP includes location information and bandwidth information of the initial BWP, the operation (2) may include operations as follows. The terminal acquires location information and bandwidth information of the initial BWP in a carrier of the camping cell from a System Information Block SIB1 transmitted by the first base station, and records the location information and the bandwidth information of the initial BWP.

In a second implementation, when the related information of the BWP includes frequency domain location information of the BWP, and the frequency domain location information of the BWP includes location information of the starting RB of the initial BWP, the operation may include operations as follows. The terminal acquires location information and bandwidth information of an initial BWP in a carrier of the camping cell from a System Information Block SIB1 sent by the first base station, and acquires the location information of the starting RB in the initial BWP from the location information and the bandwidth information of the initial BWP, and records the location information of the starting RB.

The initial BWP includes multiple RBs, and the operation that the terminal acquires the location information of the starting RB in the initial BWP from the location information and the bandwidth information of the initial BWP may include operations as follows. From the bandwidth information of the initial BWP, the terminal determines the starting RB form the initial BWP, and acquires the location information of the starting RB from the location information of the initial BWP.

In the third implementation, when the related information of the BWP includes frequency domain location information of the SSB, and the frequency domain location information of the SSB is a subcarrier offset, the operation may include operations as follows. The terminal acquires a subcarrier offset of the SSB corresponding to the BWP from a MIB transmitted by the first base station, and records the subcarrier offset of the SSB.

It should be noted that in addition to the frequency domain location information of the BWP and/or frequency domain location information of the SSB, and the related information of the BWP further includes related information of a cell where the BWP is located. The related information of the cell where the BWP is located includes at least one of: a PLMN identity of a cell where connection is failed, a global unit identity of a cell where connection is failed, a measurement result of the cell, location information of the terminal, and related information of random access. The related information of random access includes at least one of: the number of transmitting a random access preamble, detection of contention, and reaching maximum transmit power.

At S403, an access complete message is transmitted to the second base station in response to that connection establishment is successful. The access complete message includes a reporting indication, and the reporting indication indicates that there is the related information of the BWP to be reported based on which the connection establishment is failed.

It should be noted that the reporting indication may be a field or a specific instruction. When the reporting indication is a field, whether there is the related information of the BWP to be reported based on which the connection establishment is failed is indicated through contents of the field. For example, when the content of the field is 0, it is indicated that no related information of the BWP based on which the connection establishment is failed needs to be reported. When the content of the field is 1, it is indicated that there is the related information of the BWP to be reported based on which the connection establishment is failed needs.

The terminal re-selects a BWP from the camping cell in response to that connection establishment is failed, and transmits a connection establishment request to the second base station based on the reselected BWP until the connection establishment is successful. The reselected BWP is different from the previously selected BWP. The process of reselecting the BWP from the camping cell is the same as the process of selecting the BWP from the camping cell, which is not described repeatedly herein.

At S404, the second base station receives the access complete message transmitted by the terminal.

At S405, the second base station transmits an acquisition request to the terminal in response to the access complete message, and the acquisition request is used to request the related information of the BWP.

When the access complete message includes a reporting indication, and the reporting indication indicates that there is the related information of the BWP to be reported based on which the connection establishment is failed, the base station transmits the acquisition request to the terminal.

At S406, the terminal receives the acquisition request which is transmitted by the second base station in response to the access complete message.

At S407, the terminal transmits the related information of the BWP to the second base station in response to the acquisition request.

The terminal can transmit the related information of the BWP to the second base station separately, or carry the related information of the BWP in other messages which communicates with the second base station. In the embodiments of the present disclosure, the specific manners in which the terminal transmits the related information of the BWP to the second base station is not limited. For example, the terminal can carry the related information of the BWP in the variable VarConnEstFailReport for reporting the related failure message.

The related information of the BWP includes frequency domain location information of the BWP and/or frequency domain location information of the SSB.

In the first implementation, when the related information of the BWP includes frequency domain location information of the BWP, and the frequency domain location information of the BWP includes location information and bandwidth information of the initial BWP, the operation may include an operation as follows. The terminal transmits location information and bandwidth information of an initial BWP in a carrier of the camping cell to the second base station.

In the second implementation, when the related information of the BWP includes frequency domain location information of the BWP, and the frequency domain location information of the BWP includes location information of a starting RB of an initial BWP, the operation may include an operation as follows. The terminal transmits location information of the starting RB in the initial BWP to the second base station.

In the third implementation, when the related information of the BWP includes the frequency domain location information of the SSB, and the frequency domain location information of the SSB is a subcarrier offset, the operation may include an operation as follows. The terminal transmits the subcarrier offset of the corresponding SSB to the second base station It should be noted that in addition to the frequency domain location information of the BWP and/or the frequency domain location information of the SSB, the related information of the BWP sent by the terminal to the second base station further includes related information of a cell where the BWP is located. The related information of the cell where the BWP is located includes at least one of: a PLMN identity of a cell where connection is failed, a global unit identity of a cell where connection is failed, a measurement result of the cell, location information of the terminal, and related information of random access. The related information of random access includes at least one of: the number of transmitting a random access preamble, detection of contention, and reaching maximum transmit power.

It should be noted that the terminal may transmit the multiple pieces of related information of the BWP to the second base station or may transmit the one piece of related information of the BWP among the multiple pieces of related information of the BWP to the second base station, in response to that the connection establishment is failed for multiple times before the connection establishment is successful. Accordingly, when the terminal transmits one piece of related information of the BWP to the second base station, the terminal may transmit the related information of the BWP used when the connection establishment is failed most recently to the second base station.

At S408, the second base station receives the related information of the BWP which is sent by the terminal in response to the acquisition request.

It should be noted that in the embodiments of the present disclosure, only when the second base station requests the related information of the BWP from the terminal, the terminal reports the related information of the BWP to the second base station. In another possible implementation, the terminal transmits the related information of the BWP to the second base station upon connection establishment is successful.

At S409, the second base station performs troubleshooting on the BWP based on the related information of the BWP.

In a possible implementation, the second base station determines the cell where access is failed and a reason for accessing failure based on the received related information of the BWP, determines frequency domain location information of the initial BWP based on initial location information and bandwidth information of the BWP or location information of the RB, and determines the BWP based on the frequency domain location information of the initial BWP, and/or, the second base station determines frequency domain location information of the SSB based on the received subcarrier offset information of the SSB, determines the BWP based on the frequency domain location information of the SSB, and determines a failure of the BWP based on the reason for accessing failure described above.

In another possible implementation, the second base station may perform troubleshooting through the TCE. Accordingly, this operation may include operations as follows. The second base station transmits the related information of the BWP to the TCE, and the TCE receives the related information of the BWP sent by the second base station, and performs troubleshooting on the BWP based on the related information of the BWP. The process of performing troubleshooting on the BWP by the TCE based on the related information of the BWP is the same as the process of performing troubleshooting on the BWP by the second base station based on the related information of the BWP, which is not described herein.

In the embodiments of the present disclosure, the terminal transmits the connection establishment request to the first base station, records related information of related BWP in response to that the connection establishment is failed, and transmits the related information of the related BWP to the second base station in response to that the connection establishment is successful. The second base station performs troubleshooting based on the related information of the BWP, which solves a problem that the second base station cannot perform troubleshooting based on related failure information of a camping cell.

Figure 6:
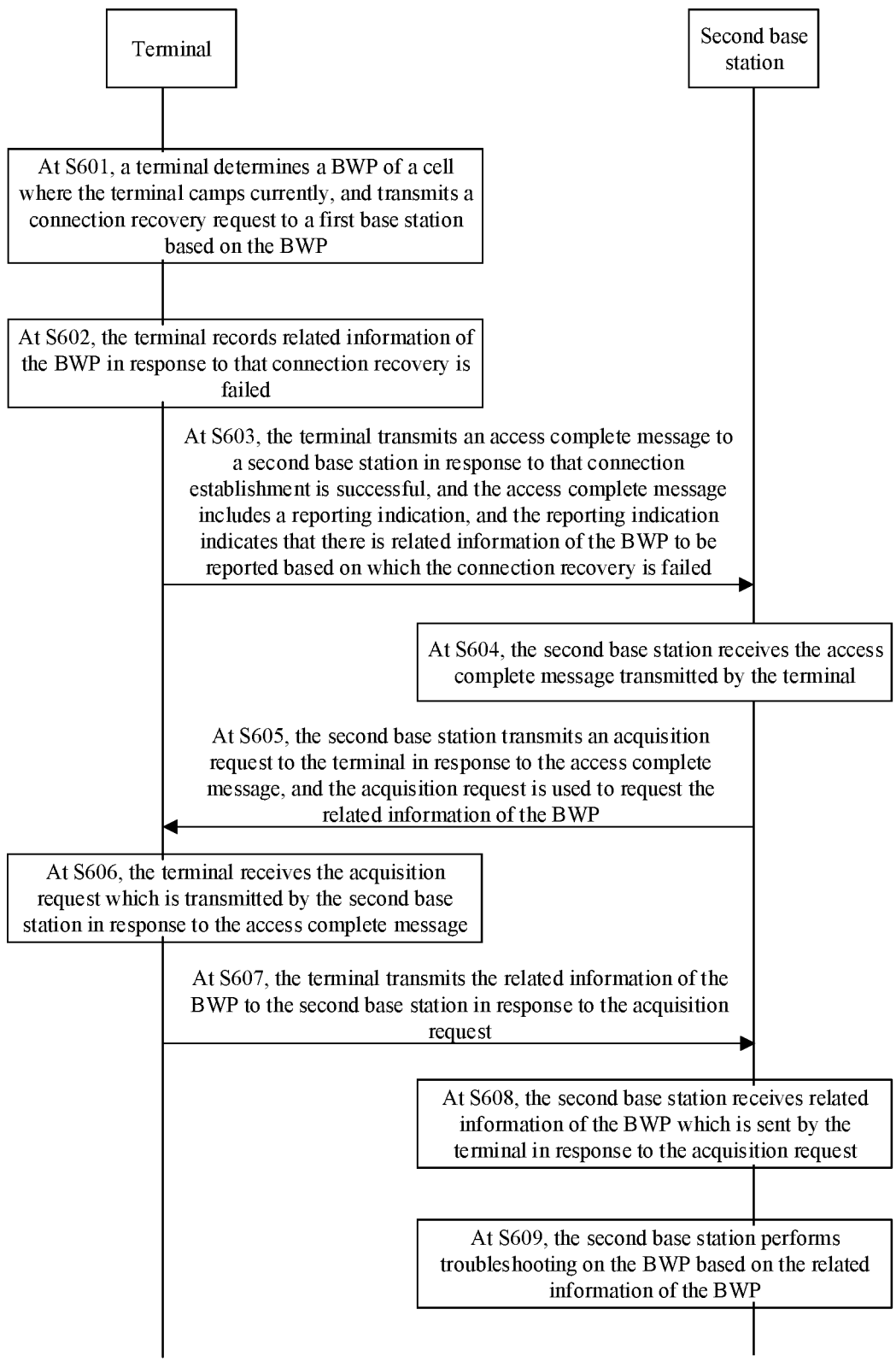
FIG. 6 is a flowchart of a method for troubleshooting according to an exemplary embodiment.

FIG. 6 is a flowchart of a method for troubleshooting according to an exemplary embodiment. In the embodiments of the present disclosure, the following condition is taken as an example for description. The terminal transmits a connection recovery request to the first base station, and records related information of a BWP in response to that connection recovery is failed, and transmits the related information of the BWP to the second base station in response to that connection recovery is successful. The second base station performs troubleshooting based on the related information of the BWP. As shown in FIG. 6, the method for troubleshooting may include following operations.

At S601, the terminal determines a BWP of a cell where the terminal camps currently, and transmits a connection recovery request to the first base station based on the BWP.

When the terminal camps on a cell, the terminal needs to determine an initial BWP selected when the terminal camps on the camping cell, and transmit a connection recovery request to the first base station based on the initial BWP. A manner of selecting the initial BWP is the same as the manner for selecting the initial BWP in S401, which is not be repeatedly described here.

At S602, related information of the BWP is recorded in response to that connection recovery is failed.

This operation can be implemented by the following operations (1) and (2).

In operation (1), the terminal determines whether the connection recovery is successful, and performs operation (2) in response to that the connection recovery is failed.

A second timer is started when the terminal transmits a connection recovery request to the first base station, and it is determine that whether a connection recovery response sent by the first base station is received before the second timer times out. When the connection recovery response sent by the first base station is received before the second timer times out, it is determined that connection recovery is successful. When the connection recovery response sent by the first base station is not received before the second timer times out, it is determined that the connection recovery is failed.

The connection recovery response may be permission for connection recovery or rejection for connection recovery. The second timer is an reestablishment timer, for example, the second timer may be a timer T319. A second duration set by the second timer may be 100 ms, 200 ms, 600 ms or 1000 ms, which is no limited in this embodiment of the present disclosure.

In operation (2), the terminal records the related information of the BWP in response to that connection recovery is failed.

This operation is the same as the operation (2) in S402, and is not repeatedly described here anymore.

At S603, an access complete message is transmitted to the second base station in response to that connection establishment is successful. The access complete message includes a reporting indication, and the reporting indication indicates that there is the related information of the BWP to be reported based on which the connection recovery is failed.

The reporting indication is the same as the reporting indication in S403, and is not repeatedly described here anymore.

The terminal re-selects a BWP from the camping cell in response to that connection recovery is failed, and transmits a connection recovery request to the first base station based on the reselected BWP until the connection recovery is successful. The reselected BWP is different from the previously selected BWP, and the process of reselecting the BWP from the camping cell by the terminal is the same as the process of selecting the BWP from the camping cell by the terminal, which is not described repeatedly herein anymore.

At S604, the second base station receives the access complete message transmitted by the terminal.

At S605, the second base station transmits an acquisition request to the terminal in response to the access complete message, and the acquisition request is used to request the related information of the BWP.

When the access complete message includes the reporting indication, and the reporting indication indicates that there is the related information of the BWP to be reported based on which the connection recovery is failed, the base station transmits the acquisition request to the terminal.

At S606, the terminal receives the acquisition request which is transmitted by the second base station in response to the access complete message.

At S607, the terminal transmits the related information of the BWP to the second base station in response to the acquisition request.

This operation is the same as the operation in S407, and is not repeatedly described here anymore.

It should be noted that the terminal may transmit the multiple pieces of related information of the BWP to the second base station in response to that the connection recovery is failed for multiple times before the connection recovery is successful, or may transmit the one piece of related information of the BWP among the multiple pieces of related information of the BWP to the second base station. When the terminal transmits the one piece of related information of the BWP to the second base station, the terminal may transmit the related information of the BWP used when the connection recovery is failed most recently to the second base station.

At S608, the second base station receives the related information of the BWP which is sent by the terminal in response to the acquisition request.

At S609, the second base station performs troubleshooting on the BWP based on the related information of the BWP.

The operations in S608 to S609 are the same as operations in S408 to S409, and are not repeatedly described here anymore.

In the embodiments of the present disclosure, the terminal transmits a connection recovery request to the first base station, records related information of a BWP in response to that the connection recovery is failed, and transmits the related information of the BWP to the second base station in response to that the connection recovery is successful. The second base station performs troubleshooting based on the related information of the BWP, which solves a problem that the second base station cannot perform troubleshooting based on related failure information of a camping cell.

Figure 7:
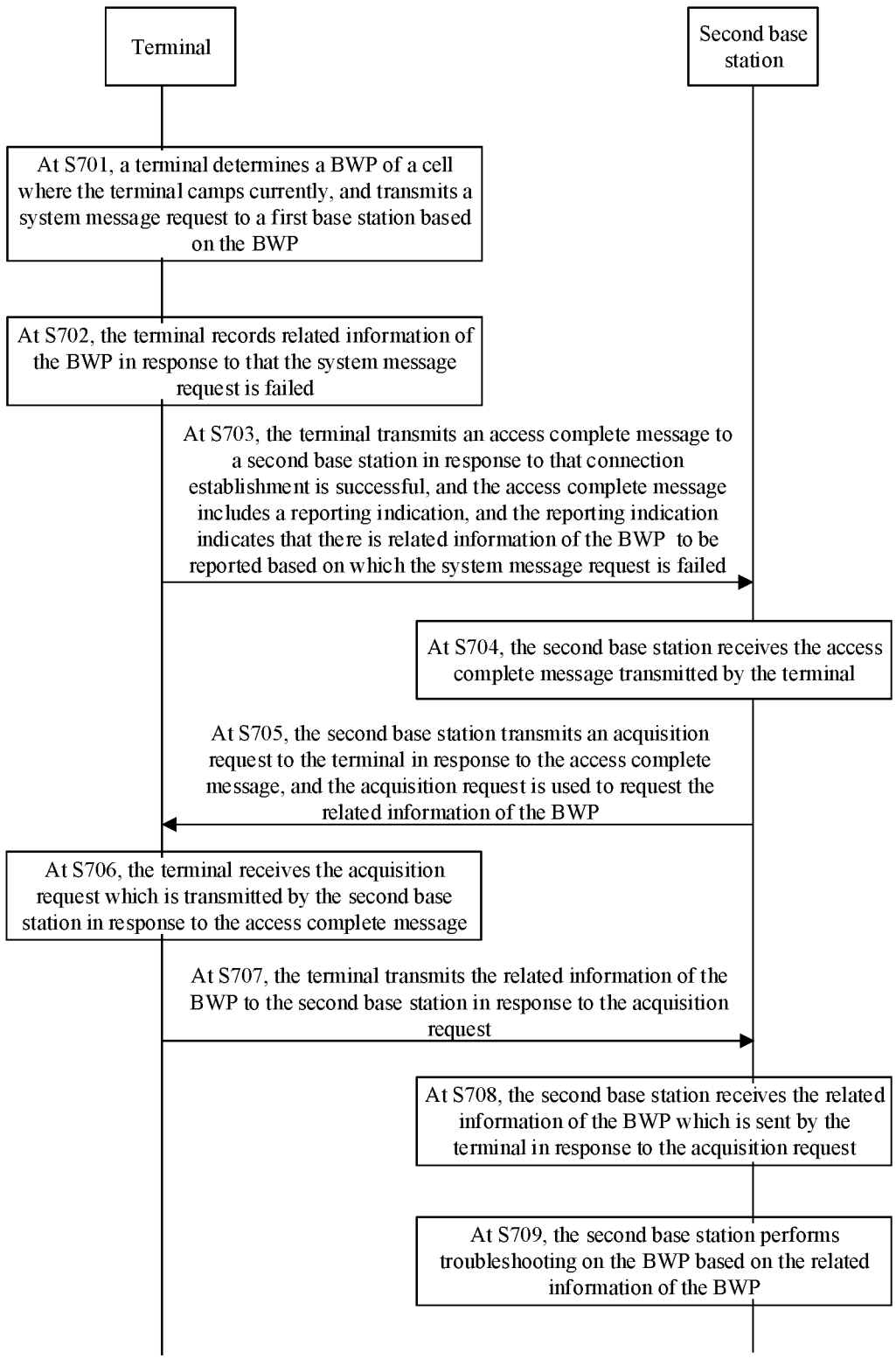
FIG. 7 is a flowchart of a method for troubleshooting according to an exemplary embodiment.

FIG. 7 is a flowchart of a method for troubleshooting according to an exemplary embodiment. In the embodiments of the present disclosure, the following condition is taken as an example for description. The terminal transmits a system message request to the first base station, records related information of a BWP in response to that the system message request is failed, and transmits the related information of the BWP to the second base station in response to that the system message request is successful. The second base station performs troubleshooting based on the related information of the BWP. As shown in FIG. 7, the method for troubleshooting may include following operations.

At S701, the terminal determines a BWP of a cell where the terminal camps currently, and transmits a system message request to the first base station based on the BWP.

When the terminal camps on a cell, the terminal needs to determine an initial BWP selected when the terminal camps on the camping cell, and transmit a system message request to the first base station based on the initial BWP. A manner of selecting the initial BWP is the same as the manner for selecting the initial BWP in S401, which is not be repeatedly described here.

At S702, related information of the BWP is recorded in response to that the system message request is failed.

The terminal performs the system message request through a random access process. That is, the terminal transmits the system message request through a random access message1 (msg1) or message3 (msg3). In other words, the system message request is successful in response to the random access is completed.

This operation can be implemented by the following operations (1) and (2).

In operation (1), the terminal determines whether the system message request is successful, and performs operation (2) in response to that the system message request is failed.

The terminal transmits the system message request by transmitting the random access message msg1 or msg3 to the first base station. A third timer is started when the terminal transmits the msg1 to the first base station. It is determined whether the message2 (msg2) sent by the first base station is received before the third timer times out. When the msg2 sent by the first base station is received before the third timer times out, it is determined that the system message request is successful. When the msg2 sent by the first base station is not received before the third timer times out, it is determined that the system message request is failed. A fourth timer is started when the terminal transmits msg3 to the first base station. It is determined whether the message4 (msg4) sent by the first base station is received before the fourth timer times out. When the msg4 sent by the first base station is received before the fourth timer times out, it is determined that the system message request is successful. When the msg4 sent by the first base station is not received before the fourth timer times out, it is determined that the system message request is failed.

The third timer and the fourth timer are virtual timers which are configured for a random access process by the first base station in the random access process. A third duration and a fourth duration which are set by the third timer and the fourth timer may be the same or different.

In operation (2), the terminal records the related information of the BWP in response to that system message request is failed.

This operation is the same as the operation (2) in S402 and S602, and is not repeatedly described here anymore.

At S703, the terminal transmits an access complete message to the second base station in response to that connection establishment is successful, and the access complete message includes a reporting indication, and the reporting indication indicates that there is the related information of the BWP to be reported based on which the system message request is failed.

The reporting indication is the same as the reporting indication in S403 and S603, and is not repeatedly described here anymore.

The terminal re-selects a BWP from the camping cell in response to that system message request is failed, and transmits a system message request to the second base station based on the reselected BWP until the system message request is successful. The reselected BWP is different from the previously selected BWP, and the process of reselecting the BWP from the camping cell by the terminal is the same as the process of selecting the BWP from the camping cell, and is not repeatedly described herein anymore.

At S704, the second base station receives the access complete message transmitted by the terminal.

At S705, the second base station transmits an acquisition request to the terminal in response to the access complete message, and the acquisition request is used to request the related information of the BWP.

When the access complete message includes a reporting indication, and the reporting indication indicates that there is the related information of the BWP to be reported based on which the system message request is failed, the base station transmits the acquisition request to the terminal.

At S706, the terminal receives the acquisition request which is transmitted by the second base station in response to the access complete message At S707, the terminal transmits the related information of the BWP to the second base station in response to the acquisition request.

This operation is the same as the operations in S407 and S607, and is not repeatedly described here anymore.

It should be noted that the terminal may transmit the multiple pieces of related information of the BWP to the second base station in response to that the system message request is failed for multiple times before the system message request is successful, or may transmit one piece of related information of the BWP among the multiple pieces of related information of the BWP to the second base station. When the terminal transmits the one piece of related information of the BWP to the second base station, the terminal may transmit the related information of the BWP used when the connection recovery is failed most recently to the second base station.

At S708, the second base station receives the related information of the BWP which is sent by the terminal in response to the acquisition request.

At S709, the second base station performs troubleshooting on the BWP based on the related information of the BWP.

The operations in S708 to S709 are the same as operations in S408 to S409 and operations in S608 to S609, and are not repeatedly described here anymore.

In the embodiments of the present disclosure, the terminal transmits a system message request to the first base station, records related information of a BWP in response to that the system message request is failed, and transmits the related information of the BWP to the second base station in response to that the system message request is successful. The second base station performs troubleshooting based on the related information of the BWP, which solves a problem that the second base station cannot perform troubleshooting based on related failure information of a camping cell.

Figure 8:
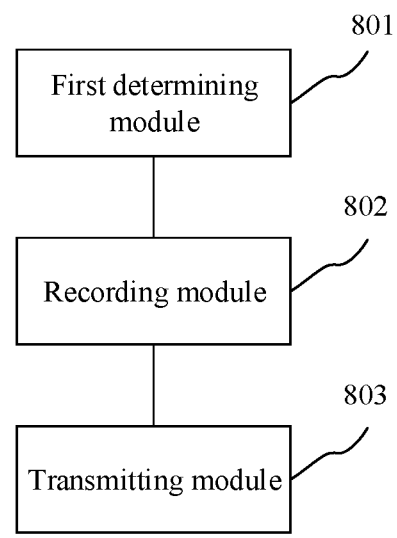
FIG. 8 is a block diagram of a device for troubleshooting according to an exemplary embodiment.

FIG. 8 is a block diagram of a device for troubleshooting according to an exemplary embodiment, which is applied to a terminal to perform the operations performed by the terminal in the above method for troubleshooting. Referring to FIG. 8, the device includes a first determining module 801, a recording module 802 and a transmitting module 803.

The first determining module 801 is configured to determine a BWP of a cell where the terminal camps currently, and access a first base station based on the BWP.

The recording module 802 is configured to record related information of the BWP in response to that the terminal fails to access the first base station.

The transmitting module 803 is configured to transmit the related information of the BWP to a second base station in response to that the terminal accesses the second base station successfully, and the related information of the BWP is used for troubleshooting. The second base station and the first base station are same base station or different base stations.

In a possible implementation, the case that the terminal fails to access the first base station includes at least one of following conditions: connection establishment is failed, connection recovery is failed or a system message request is failed.

In a possible implementation, the device may further include a second determining module or a third determining module.

The second determining module is configured to start a first timer when the terminal transmits a connection establishment request to the first base station, and determine that connection establishment between the terminal and the first base station is failed in response to that the first timer times out.

The third determining module is configured to start a second timer when the terminal transmits a connection recovery request to the first base station, and determine that connection recovery between the terminal and the first base station is failed in response to that the second timer times out.

In a possible implementation, the related information of the BWP includes frequency domain location information of the BWP. The frequency domain location information of the BWP includes location information and bandwidth information. The recording module is further configured to acquire, from a System Information Block SIB1 transmitted by the first base station, location information and bandwidth information of an initial BWP in a carrier of the camping cell, and record the location information and the bandwidth information of the initial BWP.

In a possible implementation, the related information of the BWP includes frequency domain location information of the BWP. The frequency domain location information of the BWP includes location information of a starting RB. The recording module is further configured to acquire, from a system information block SIB1 sent by the first base station, location information and bandwidth information of an initial BWP in a carrier of the camping cell, and acquires, from the location information and the bandwidth information of the initial BWP, location information of the starting RB in the initial BWP, and record the location information of the starting RB.

In a possible implementation, the related information of the BWP includes frequency domain location information of an SSB corresponding to the BWP. The frequency domain location information of the SSB is a subcarrier offset. The recording module is further configured to acquire, from a MIB transmitted by the first base station, a subcarrier offset of an SSB corresponding to the BWP, and record the subcarrier offset of the SSB.

In a possible implementation, the first determining module is further configured to determine an initial BWP selected when the terminal camps on the camping cell.

In a possible implementation, the transmitting module is further configured to transmit an access complete message to the second base station. The access complete message includes a reporting indication, and the reporting indication indicates that there is the related information of the BWP to be reported based on which accessing the first base station is failed. The transmitting module is configured to receive an acquisition request which is transmitted by the second base station in response to the access complete message. The acquisition request is used to request the related information to the BWP. The transmitting module is configured to transmit the related information of the BWP to the second base station in response to the acquisition request.

Figure 9:
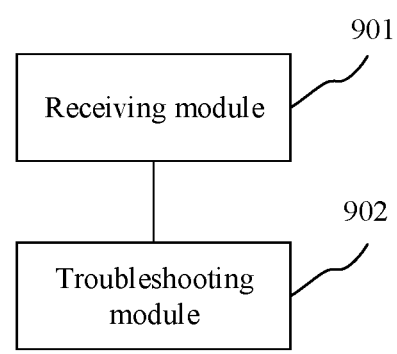
FIG. 9 is a block diagram of a device for troubleshooting according to an exemplary embodiment.

FIG. 9 is a block diagram of a device for troubleshooting according to an exemplary embodiment. The device is applied to a second base station to perform the operations performed by the second base station in the above method for troubleshooting. Referring to FIG. 9, the device includes a receiving module 901 and a troubleshooting module 902.

The receiving module 901 is configured to receive related information of a BWP transmitted by a terminal in response to that the terminal successfully accesses the second base station. The related information of the BWP is related information of a BWP used when the terminal fails to access a first base station previously.

The troubleshooting module 902 is configured to perform troubleshooting on the BWP based on the related information of the BWP.

In a possible implementation, the troubleshooting module is further configured to transmit the related information of the BWP to a TCE. The related information of the BWP is used by the TCE to perform troubleshooting on the BWP.

In a possible implementation, the receiving module is further configured to receive an access complete message transmitted by the terminal. The access complete message includes a reporting indication, and the reporting indication indicates that there is the related information of the BWP to be reported based on which accessing the first base station is failed. The receiving module is configured to transmit the acquisition request to the terminal in response to the access complete message. The acquisition request is used to request the related information of the BWP. The receiving module is configured to receive the related information of the BWP which is sent by the terminal in response to the acquisition request.

It should be noted that division of the above function modules in the above device for troubleshooting provided in the above embodiments is exemplary. In actual application, the above functions may be allocated to be performed by different functional modules according to needs. That is, the internal structure of the device is divided into different function modules to perform all or a part of the functions described above. In addition, the device for troubleshooting provided in the above mentioned embodiments and the method for troubleshooting belong to the same concept, and for the specific implementing process, reference is made to the method embodiment, which is not repeatedly described here.

Figure 10:
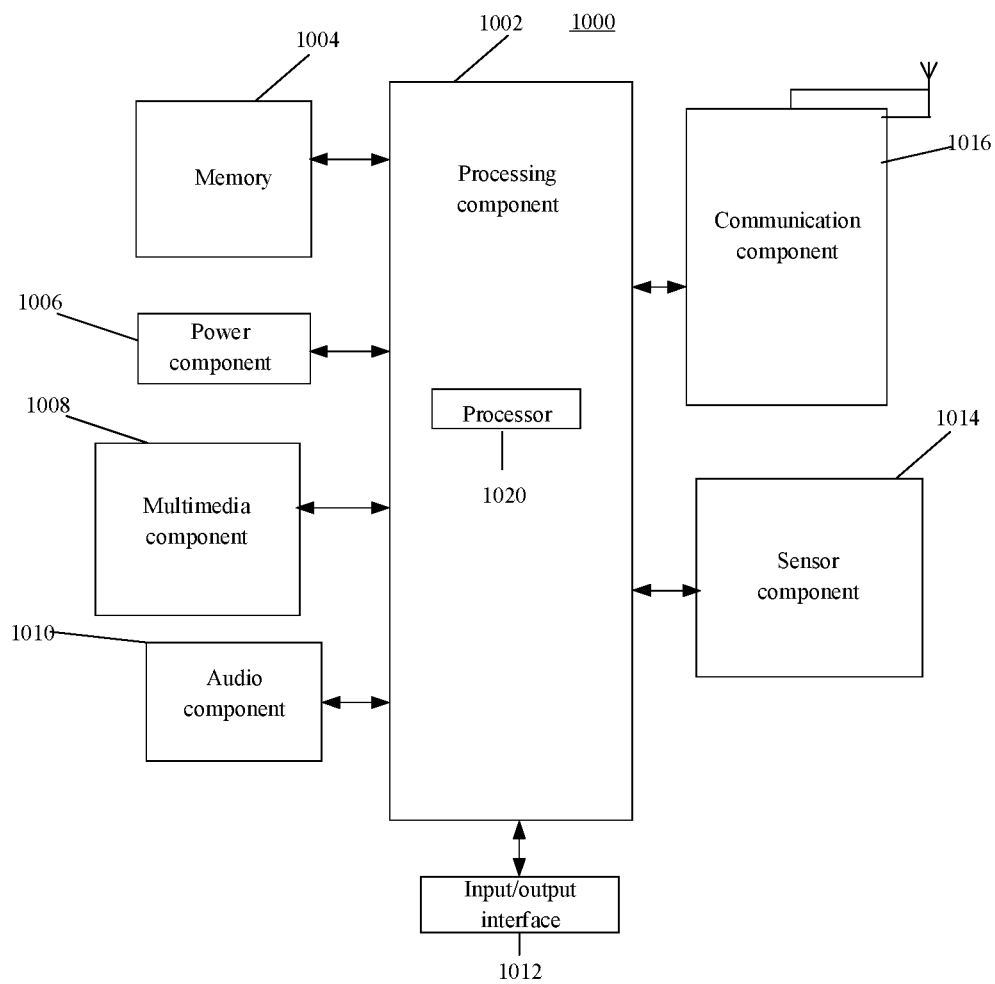
FIG. 10 is a block diagram of a device according to an exemplary embodiment.

FIG. 10 is a block diagram of a device 1000 for troubleshooting according to an exemplary embodiment. For example, the device 1000 may be a mobile phone, a computer, a digital broadcasting terminal, messaging equipment, a game console, tablet equipment, medical equipment, fitness equipment, and a personal digital assistant.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls overall operation of the device 1000, such as operations related to displaying, telephone calls, data communications, camera operations and recording operations. The processing component 1002 may include one or more processors 1020 to execute instructions, so as to implement all or a part of the operations of the method described above. In addition, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 is configured to store various types of data to support operations at the device 1000. Examples of such data include instructions for any application program or method for operating on the device 1000, contact data, phone book data, messages, pictures, videos, etc. The memory 1004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 1006 provides power for various components of the device 1000. The power component 1006 may include a power management system, one or more power supplies, and other components associated with generating, managing and distributing power for device 1000.

The multimedia component 1008 includes a screen providing an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each front camera and each rear camera may be fixed optical lens systems or may have focal lengths and optical zoom capabilities.

The audio component 1010 is configured to output and/or input audio signals. For example, the audio component 1010 includes a microphone (MIC), and the microphone is configured to receive an external audio signal when the device 1000 is in an operation mode, such as a calling mode, a recording mode, and a voice identification mode. The received audio signals may be further stored in the memory 1004 or transmitted via the communication component 1016. In some embodiments, the audio component 1010 may further include a speaker to output audio signals.

The I/O interface 1012 provides an interface between the processing component 1002 and peripheral interface modules. The peripheral interface modules may be keyboards, click wheels, buttons, etc. These buttons may include, but be not limited to, a home button, a volume button, a start button, and a lock button.

The sensor component 1014 includes one or more sensors configured to provide various aspects of state assessment for the device 1000. For example, the sensor component 1014 may detect an on/off status of the device 1000, and relative positioning of components. For example, the component is a display and a keypad of the device 1000. The sensor component 1014 may also detect a change in position of the device 1000 or a component of the device 1000, presence or absence of contact of a user with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include light sensors, such as CMOS or CCD image sensors, for imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communications between the device 1000 and another device. The device 1000 may access a wireless network based on a communication standard, such as a WiFi, a 2G or a 3G, or a combination thereof. In an exemplary embodiment, the communication component 1016 receives a broadcast signal or broadcasts related information from an external broadcast management system via a broadcast channel. In one exemplary embodiment, the communication component 1016 further includes a Near Field Communication (NFC) module to promote short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In an exemplary embodiment, the device 1000 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to implement the above method.

In an exemplary embodiment, a non-transitory computer-readable storage medium including an instruction, such as a memory 1004 including an instruction, is further provided. The instruction may be executed by a processor 1020 of the device 1000 to implement the foregoing method. For example, the non-transitory computer-readable storage medium may be a Read Only Memory (ROM), a Random Access Memory (RAM), a CD-ROM, a magnetic tape, a floppy disc, an optical data storage device, and the like.

Figure 11:
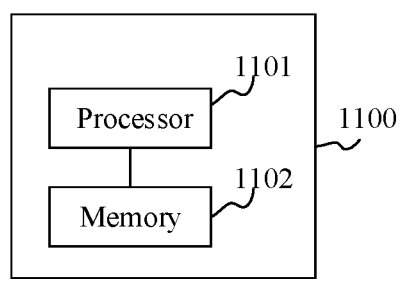
FIG. 11 is a block diagram of a base station according to an exemplary embodiment.

FIG. 11 is a schematic structural diagram of a base station according to an embodiment of the present disclosure. The base station 1100 may be different greatly based on different configurations or performances, which may include one or more processors (Central Processing Units, CPU) 1101 and one or more memory 1102. At least one instruction is stored in the memory 1102, and the at least one instruction is loaded and executed by the processor 1101 to implement the methods provided in the above method embodiments. In practice, the base station may have components such as a wired or wireless network interface, a keyboard, and input/output interfaces for inputting or outputting. The base station may also include other components for implementing a function of the device, which is not described herein.

The embodiments of the present disclosure further provide a computer-readable storage medium, which is applied to a terminal. The computer-readable storage medium stores at least one instruction, at least one program, code set, or instruction set, and the instruction, the program, the code set, or the instruction set is loaded and executed by a processor to implement operations performed by the terminal in the method for troubleshooting of the above described embodiment.

Other implementations of the present disclosure will be apparent to those skilled in the art from consideration of the specification and practice of the present disclosure. The present disclosure is intended to cover any variations, uses, or adaptations of the present disclosure which conform to the general principles thereof and include common knowledge and customary practice in the technical field that is not disclosed in the present disclosure. The specification and the embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. The scope of the present disclosure is only limited by the appended claims.

The invention claimed is:

1. A method for troubleshooting, applied to a terminal, the method comprising:
   determining a bandwidth part (BWP) of a cell where the terminal camps, and accessing a first base station based on the BWP;
   recording related information of the BWP in response to that the terminal fails to access the first base station; and
   transmitting the related information of the BWP to a second base station in response to that the terminal accesses the second base station successfully, wherein the related information of the BWP is used for troubleshooting, and the second base station and the first base station are same base station or different base stations,
   wherein the related information of the BWP comprises frequency domain location information of the BWP,
   wherein the frequency domain location information of the BWP comprises location information and bandwidth information, and the recording the related information of the BWP comprises:
   acquiring, from a System Information Block SIB1 transmitted by the first base station, location information and bandwidth information of an initial BWP in a carrier of the cell where the terminal camps; and
   recording the location information and the bandwidth information of the initial BWP.

2. The method of claim 1, wherein the case that the terminal fails to access the first base station comprises at least one of following conditions:
   connection establishment is failed, connection recovery is failed or a system message request is failed.

3. The method of claim 2, further comprising:
   starting a first timer when the terminal transmits a connection establishment request to the first base station, and determining that connection establishment between the terminal and the first base station is failed in response to that the first timer times out; or,
   starting a second timer when the terminal transmits a connection recovery request to the first base station, and determining that connection recovery between the terminal and the first base station is failed in response to that the second timer times out.

4. The method of claim 1, wherein the frequency domain location information of the BWP comprises location information of a starting Resource Block (RB), and the recording the related information of the BWP comprises:
   acquiring, from a System Information Block SIB1 transmitted by the first base station, location information and bandwidth information of an initial BWP in a carrier of the cell where the terminal camps;
   acquiring, from the location information and the bandwidth information of the initial BWP, the location information of the starting RB in the initial BWP; and
   recording the location information of the starting RB.

5. The method of claim 1, wherein the related information of the BWP comprises frequency domain location information of a Synchronization Signal Block (SSB) corresponding to the BWP.

6. The method of claim 5, wherein the frequency domain location information of the SSB is a subcarrier offset, and the recording the related information of the BWP comprises:
   acquiring, from a Master Information Block (MIB) transmitted by the first base station, the subcarrier offset of the SSB corresponding to the BWP, and recording the subcarrier offset of the SSB.

7. The method of claim 1, wherein the determining the BWP of the cell where the terminal camps comprises:
   determining an initial BWP selected when the terminal camps on the cell.

8. The method of claim 1, wherein the transmitting the related information of the BWP to the second base station comprises:
   transmitting an access complete message to the second base station, wherein the access complete message comprises a reporting indication, and the reporting indication indicates that there is the related information of the BWP to be reported based on which the terminal fails to access the first base station;
   receiving an acquisition request which is transmitted by the second base station in response to the access complete message, wherein the acquisition request is used to request the related information to the BWP; and
   transmitting the related information of the BWP to the second base station in response to the acquisition request.

9. A method for troubleshooting, applied to a second base station, the method comprising:
   receiving related information of a bandwidth part (BWP) transmitted by a terminal in response to the terminal successfully accesses the second base station, wherein the related information of the BWP is related information of a BWP used when the terminal fails to access a first base station; and
   performing troubleshooting on the BWP based on the related information of the BWP,
   wherein the receiving the related information of the BWP transmitted by the terminal comprises:
   receiving an access complete message transmitted by the terminal, wherein the access complete message comprises a reporting indication, and the reporting indication indicates that there is the related information of the BEWp to be reported based on which the terminal fails to access the first base station;
   transmitting an acquisition request to the terminal in response to the access complete message, wherein the acquisition request is used to request the related information of the BWP; and
   receiving the related information of the BWP which is sent by the terminal in response to the acquisition request.

10. The method of claim 9, wherein the performing troubleshooting on the BWP based on the related information of the BWP comprises:
    transmitting the related information of the BWP to a tracking collection entity (CE), wherein the related information of the BWP is used by the TCE to perform troubleshooting on the BWP.

11. A device for troubleshooting, applied to a terminal, the device comprising:

a processor; and memory for storing instructions executable by the processor, wherein the processor is configured to execute the instructions to:

determine a bandwidth part (BWP) of a cell where the terminal camps, and access a first base station based on the BWP;

record related information of the BWP in response to that the terminal fails to access the first base station; and transmit the related information of the BWP to a second base station in response to that the terminal accesses the second base station successfully, wherein the related information of the BWP is used for troubleshooting, and the second base station and the first base station are same base station or different base stations, wherein the related information of the BWP comprises frequency domain location information of the BWP, wherein the frequency domain location information of the BWP comprises location information and bandwidth information, and the processor is configured to execute the instructions to;

acquire, from a System Information Block SIB1 transmitted by the first base station, location information and bandwidth information of an initial BWP in a carrier of the cell where the terminal camps; and recording the location information and the bandwidth part information of the initial BWP; or wherein the frequency domain location information of the BWP comprises location information of a starting Resource Block (RB), and the processor is configured to execute the instructions to:

acquire, from a System Information Block SIB1 transmitted by the first base station, location information and bandwidth information of an initial BWP in a carrier of the cell where the terminal camps; acquire, from the location information and the bandwidth information of the initial BWP, the location information of the starting RB in the initial BWP; and record the location information of the starting RB.

12. The device of claim 11, wherein that the terminal fails to access the first base station comprises at least one of following conditions: connection establishment is failed, connection recovery is failed or a system message request is failed.

13. The device of claim 12, wherein the processor is configured to execute the instructions to:

start a first timer when the terminal transmits a connection establishment request to the first base station, and determine that connection establishment between the terminal and the first base station is failed in response to that the first timer times out; or, start a second timer when the terminal transmits a connection recovery request to the first base station, and determine that connection recovery between the terminal and the first base station is failed in response to that the second timer times out.

14. The device of claim 11, wherein the related information of the BWP comprises frequency domain location information of a Synchronization Signal Block (SSB) corresponding to the BWP, wherein the frequency domain location information of the SSB is a subcarrier offset, and the processor is configured to execute the instructions to:

acquire, from a Master Information Block (MIB) transmitted by the first base station, the subcarrier offset of the SSB corresponding to the BWP; and record the subcarrier offset of the SSB.

15. The device of claim 11, wherein the processor is further configured to execute the instructions to determine an initial BWP selected when the terminal camps on the cell.

* * * * *